United States Patent [19]
Neff et al.

[11] Patent Number: 4,574,844
[45] Date of Patent: Mar. 11, 1986

[54] FOUR-WAY POPPET VALVE

[75] Inventors: James A. Neff, Bloomfield Township, Oakland County; Richard A. Fagerlie, Union Lake, both of Mich.

[73] Assignee: MAC Valves, Inc., Wixom, Mich.

[21] Appl. No.: 671,083

[22] Filed: Nov. 13, 1984

[51] Int. Cl.⁴ .................................................. F15B 13/044
[52] U.S. Cl. .......................... 137/625.65; 137/625.27; 137/884
[58] Field of Search .................. 137/625.27, 625.65, 137/884

[56] References Cited

U.S. PATENT DOCUMENTS

| | | | |
|---|---|---|---|
| 3,527,253 | 9/1970 | Harpman | 137/625.65 X |
| 3,538,954 | 11/1970 | Fagerlie et al. | 137/625.65 |
| 3,762,443 | 10/1973 | Sorenson | 137/625.27 |
| 4,298,027 | 11/1981 | Neff | 137/625.65 |
| 4,453,565 | 6/1984 | Neff | 137/884 X |

Primary Examiner—Gerald A. Michalsky
Attorney, Agent, or Firm—Robert G. Mentag

[57] ABSTRACT

A four-way, poppet valve having a plurality poppet valve elements mounted on a poppet valve spool. The poppet valve spool is movable in one direction by a return spring to a first operative position, whereby one pair of the poppet valve elements are seated on a first pair of poppet valve seats to control the flow of pressurized air through the valve from a pressurized air inlet port and out through a first cylinder port and simultaneously to exhaust air entering a second cylinder port. A solenoid means having a floating pole piece is provided for moving the valve spool to a second operative position, whereby a second pair of the poppet valve elements are seated on a second pair of poppet valve seats to reverse the flow of pressurized air through the valve. The flow of exhausting air may be controlled by a pair of flow control valves.

8 Claims, 11 Drawing Figures

4,574,844

FOUR-WAY POPPET VALVE

TECHNICAL FIELD

This invention relates generally to the air valve art, and more particularly, to an improved four-way poppet valve which may optionally include a flow control function. The four-way poppet valve of the present invention is adapted for use in air flow lines for controlling the direction and flow of air in the lines, as for example, air supply lines connected to the ends of an air cylinder.

BACKGROUND ART

It is known in the air valve art to provide four-way valves which employ a sliding type of valve spool with annular seal means. It is also known to operate such sliding valve spools by direct solenoid operation. A disadvantage of the last mentioned prior art four-way valves is that in order to provide a high flow of fluid, as air, a long stroke of the valve spool is required, together with a large solenoid for operating the same, and a large valve structure for housing the valve spool and the solenoid. It is also known in the air valve art to provide three-way poppet type valves for controlling the flow of fluid, such as air in a fluid flow control system. An advantage of a poppet type valve is that maximum flow can be provided with a short stroke. Heretofore, a problem in producing a four-way poppet valve was the provision of a poppet valve structure which was capable of efficiently and simultaneously sealing a pair of poppet seals when the valve spool carrying the poppet valves was operated directly by a solenoid. Examples of prior art three-way poppet valves are shown in U.S. Pat. Nos. 4,271,868, 4,298,027 and 4,407,323.

DISCLOSURE OF THE INVENTION

In accordance with the present invention, a four-way poppet valve is provided which can be installed in an air supply system for controlling the direction and flow of air to the opposite ends of an air cylinder or the like. The four-way poppet valve includes a poppet valve spool which carries a pair of poppet valves, and wherein the poppet valve spool is of a one-piece construction. The poppet spool valve is directly operated by a solenoid having a floating pole piece. The valve includes a pair of adjustable bushings which each carry a poppet valve seat that may be adjusted relative to the poppet valves carried on the poppet valve spool, so that two poppet valves are seated on their respective poppet valve seats, when the poppet valve spool is in a first or initial operating position, as well as when in a second operating position. The four-way poppet valve spool is a balanced valve spool.

The valve of the present invention provides a four-way poppet valve, which may be optionally provided with a flow control function, and which is compact and provided with a short stroke, and yet which provides a large flow of fluid therethrough when the poppet valve spool is in either one of its two operating positions. The short stroke feature and compactness of the valve provides an efficiently operating valve which can be operated by a small size general purpose solenoid having a floating pole piece, and with low-wattage, or high-wattage, power consumption.

BEST MODE OF CARRYING OUT THE INVENTION

Figure 1:
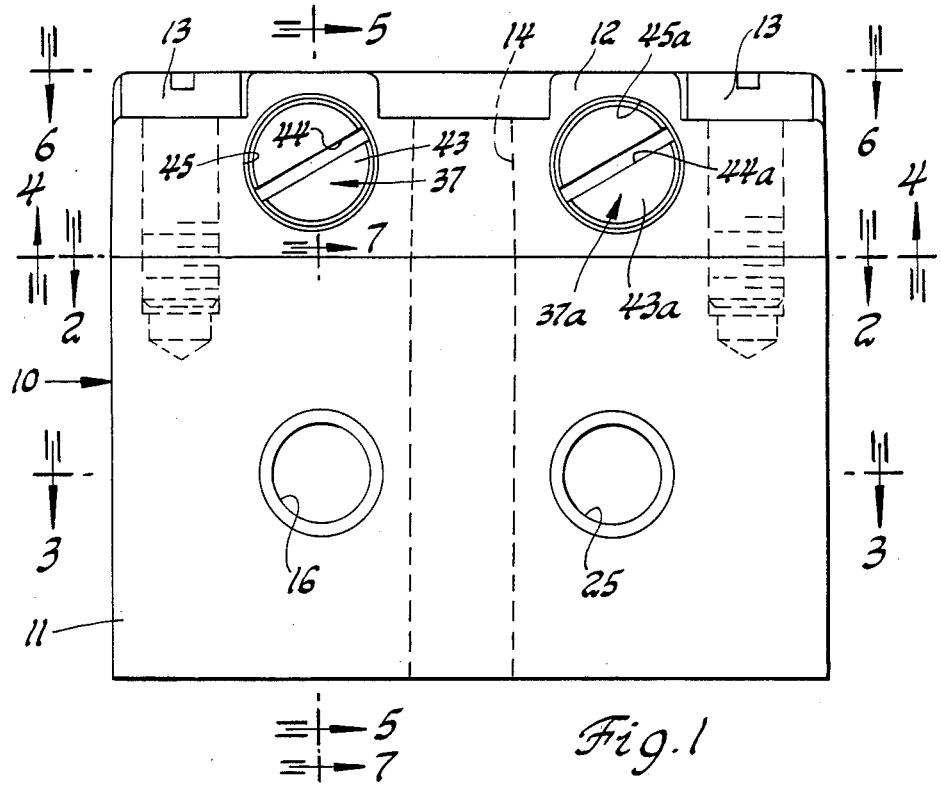
FIG. 1 is a front elevation view of a four-way poppet valve, with an optional flow control function, and made in accordance with the principles of the present invention.

Referring now to the drawings, and in particular to FIG. 1, the numeral 10 generally designates an illustrative embodiment of a four-way poppet valve, which is provided with an optional flow control function, and which is made in accordance with the principles of the present invention. The valve 10 includes a valve body 11, which is enclosed on the top end thereof, by a top end flow control valve cover plate 12. The flow control valve cover plate 12 is releasably secured in position on the top end of the valve body 11 by a plurality of suitable machine screws 13. As shown in FIGS. 1 through 4 and 6, the valve 10 is provided with a pair of mounting bolt holes 14 which extend through the valve body 11 and the cover plate 12. The holes 14 are adapted to receive suitable mounting bolts for securing the valve 10 in an operating position on an apparatus with which it is to be employed.

Figure 2:
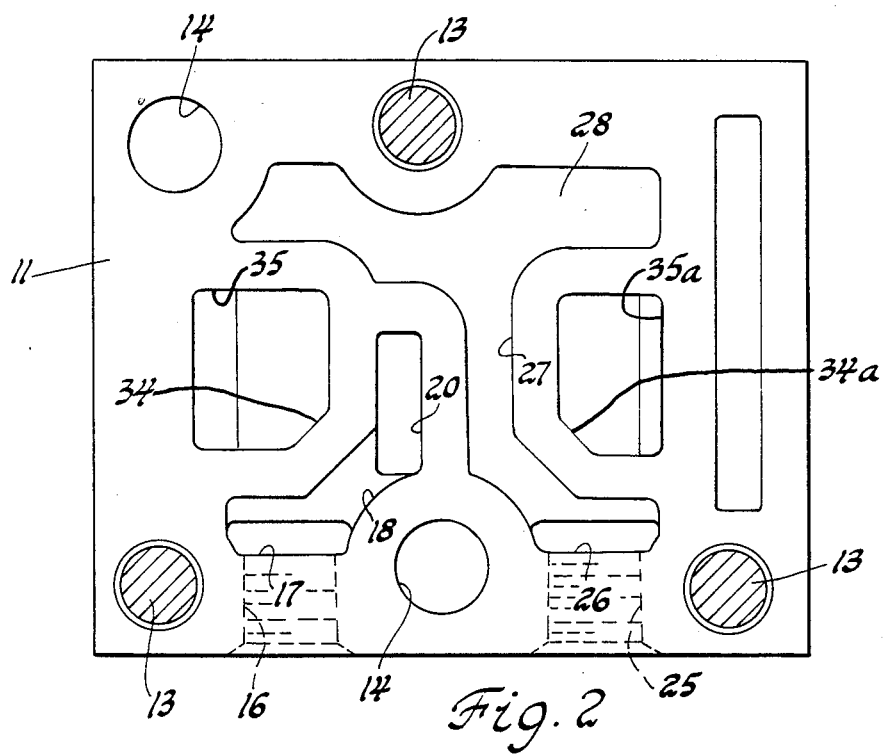
FIG. 2 is a top plan view of the valve body employed in the invention, taken along the line 2—2 of FIG. 1, and looking in the direction of the arrows.
Figure 3:
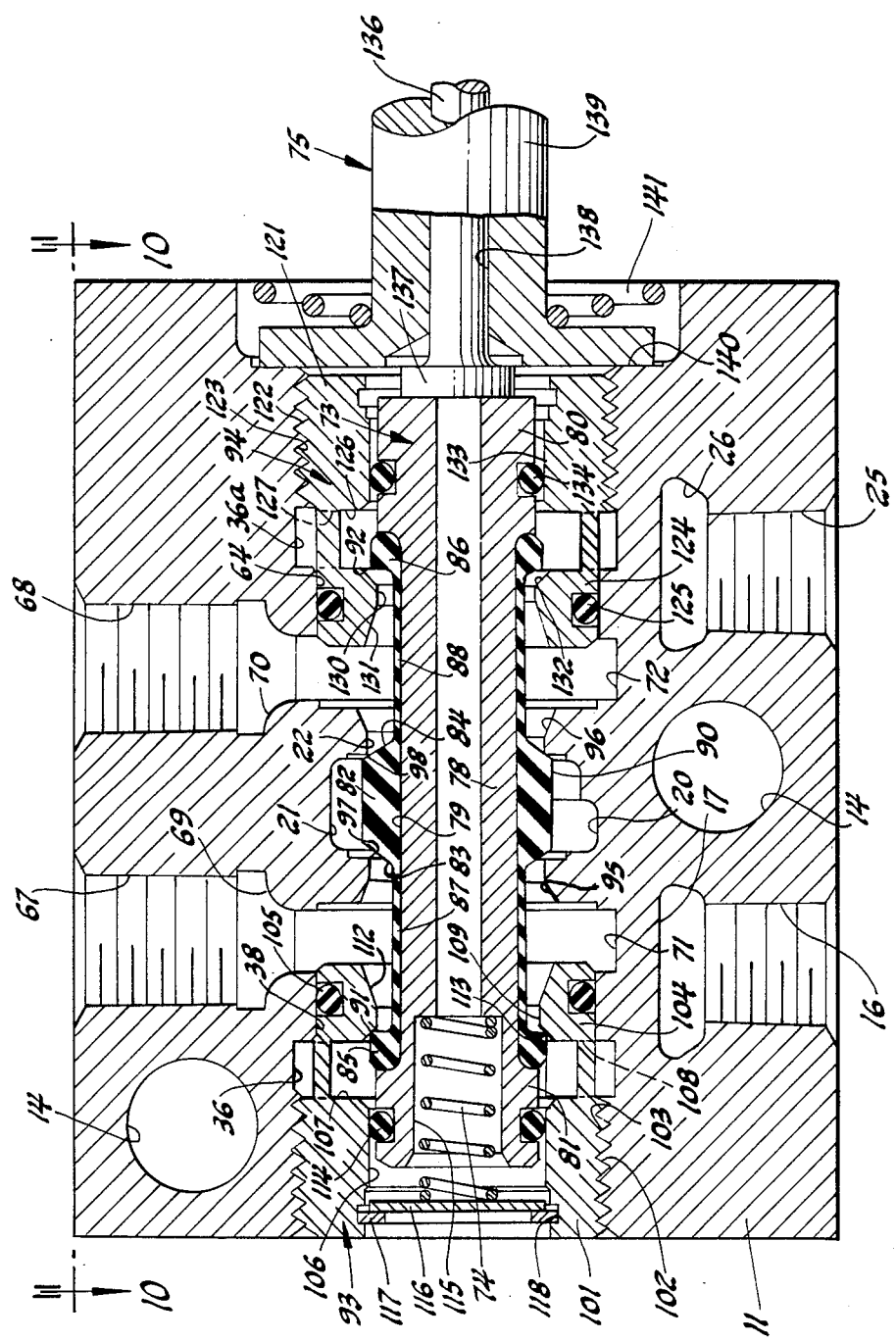
FIG. 3 is a horizontal section view, slightly enlarged, of the valve body structure illustrated in FIG. 1, taken along the line 3—3 thereof, looking in the direction of the arrows, and showing the four-way poppet valve spool employed in the invention.
Figure 4:
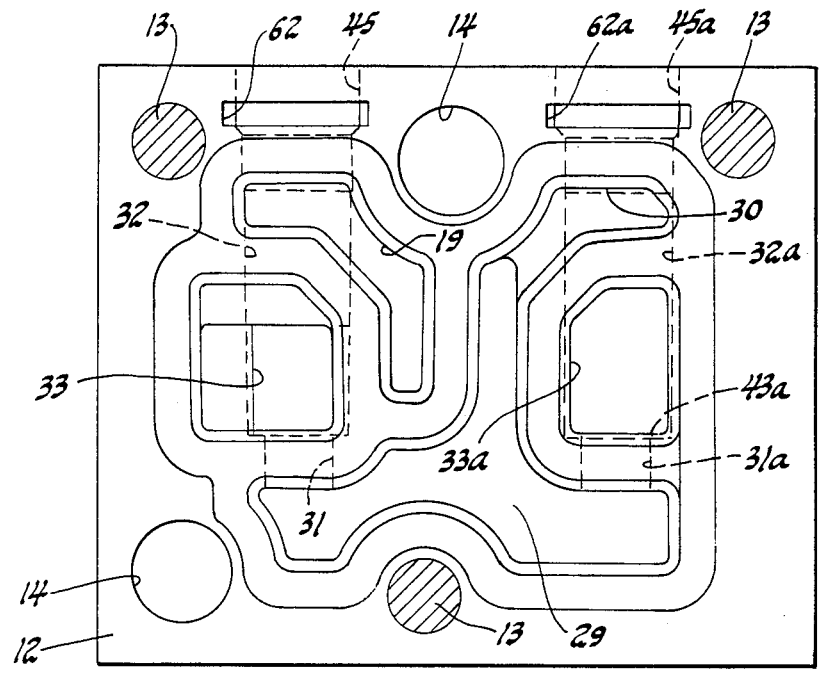
FIG. 4 is a bottom plan view of the optional flow control valve cover plate employed in the valve illustrated in FIG. 1, taken along the line 4—4 thereof, and looking in the direction of the arrows.
Figure 5:
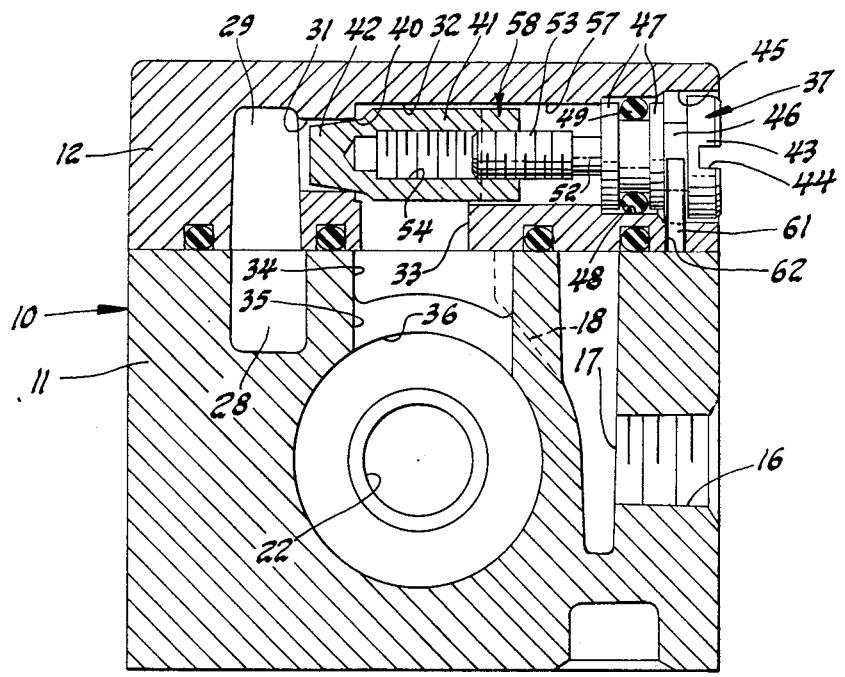
FIG. 5 is an elevation section view of the valve structure illustrated in FIG. 1, taken along the line 5—5 thereof, and looking in the direction of the arrows.
Figure 6:
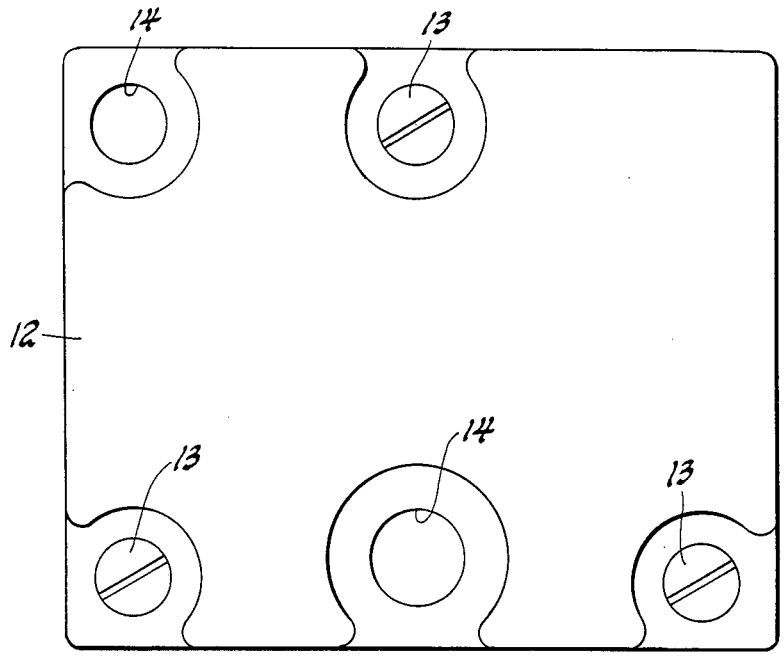
FIG. 6 is a top plan view of the valve structure illustrated in FIG. 1, taken along the line 6—6 thereof, and looking in the direction of the arrows.

As shown in FIGS. 2, 3 and 5, the valve 10 is provided with a threaded inlet or supply port 16, in the valve body 11, which would be connected to a suitable source of pressurized air. The inlet port 16 communicates at its inner end with a vertical passage 17 (FIG. 5), which in turn communicates with an upwardly curved passageway 18 (FIG. 2). The upper end of the passageway 18 communicates with a passage 19 in the cover plate 12, as shown in FIG. 4. As shown in FIG. 4, the passage 19 curves toward the center of the cover plate and terminates in a position above a vertical passageway 20 (FIG. 2) in the valve body 11. As shown in FIG. 3, the vertical passageway 20 communicates at its lower end with an annular, cylindrical pressurized air chamber 21 which is formed in the valve body 11 in a position around the valve spool bore 22.

As shown in FIG. 3, the valve 10 is provided with a threaded exhaust outlet port 25, in the valve body 11. The inner end of the exhaust port 25 communicates with an upwardly extended passageway 26. As shown in FIG. 2, the passageway 26 communicates at its upper end with an upwardly and inwardly extending, transverse passageway 27, which communicates at the rear side of the valve body 11 with a longitudinal exhaust passageway 28, so as to form a T-shaped common exhaust passageway. As shown in FIG. 4, the lower side of the cover plate 12 is provided with a similar T-shaped passageway indicated by the numerals 29 and 30, which are complementary in position to the passageways 27 and 28 in the valve body 11, when the cover plate 12 is mounted on the valve body 11.

As shown in FIG. 5 the passageway 29 in the cover plate 12 is connected through a horizontal cylindrical bore or passageway 31 to an elongated valve chamber 32, in which is operatively mounted a flow control valve, generally designated by the numeral 37. The inner end of the chamber 32, adjacent the bore 31, is cylindrical in shape, and it communicates through a downwardly extending passageway 33, with passageways 34 and 35, in the upper end of the valve body 11. The lower end of the passageway 35 communicates with an annular, cylindrical exhaust chamber 36 which is formed in the valve body 11, in a position that is concentric with the valve spool bore 22. The exhaust chamber 36 is in a position longitudinally and inwardly spaced apart from the lower end of the passageway 35. The exhaust chamber 36 is formed in the wall of an enlarged longitudinal bore 38 that terminates at its longitudinal inner end with the cylindrical chamber 71.

Figure 7:
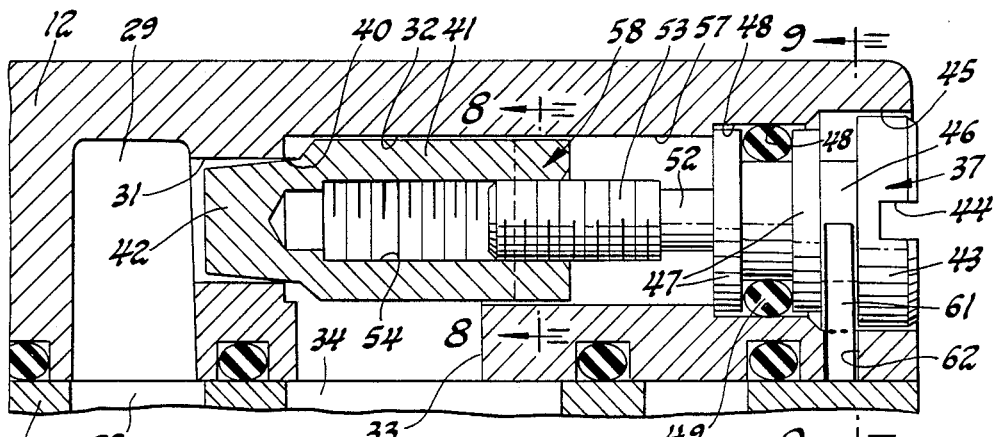
FIG. 7 is an enlarged view of the upper end of the valve structure illustrated in FIG. 5, and showing in larger detail, one of the flow control valves which may be optionally employed in the invention.

The flow of exhaust air from the exhaust chamber 36, to the exhaust port 25, is controlled by the flow control valve 37 which is shown in FIGS. 5 and 7. The flow control valve 37 has a body which is cylindrically shaped along the central and front end thereof, as indicated by the numeral 41, for sliding engagement in the cylindrical portion of the passageway 32. Integrally formed on the inner end of the valve body cylindrical portion 41 is a conically shaped valve 42, which is adapted to regulate the flow of fluid past a valve seat 40 that is formed at the inner end of the exhaust bore passage 31. As shown in FIGS. 5 and 7, the valve 42 is in a closed position relative to the valve seat 40, but when it is moved rearwardly or to the right, as shown in FIGS. 5 and 7, a flow of exhaust fluid is permitted past the valve seat 40 and out through the passages 29, 28, 27 and 26 to the exhaust port 25.

The flow control valve 37 is a non-rising type valve, which has an adjustment control head 43 that remains stationary, longitudinally, when it is rotated for adjusting the position of the valve 42. The cylindrical adjustment head 43 has a transverse slot 44 formed in the outer face thereof, for rotating the same by means of a suitable tool. The cylindrical adjustment head 43 is rotatably mounted in a bore 45, and it has integrally formed, in the inner side thereof, a reduced diameter shaft 46. The inner end of the shaft 46 is integrally attached to the outer end of a pair of longitudinally spaced apart annular flanges 47, which are positioned in a bore 48, that communicates at its outer end with the bore 45, and which is of a slightly smaller diameter than the bore 45. A suitable O-ring seal 49 is mounted in the groove between the annular flanges 47 and it sealingly engages the surface of the bore 48. Integrally attached to the inner side of the inner most one of the flanges 47 is a shaft 52 which in turn has integrally formed on its inner end an elongated threaded screw shaft 53. The screw shaft 53 is operatively mounted in a longitudinally extended threaded bore 54 which is formed in the rear end of the valve body 41, and which extends longitudinally inward from the rear end of the valve body 41.

Figure 8:
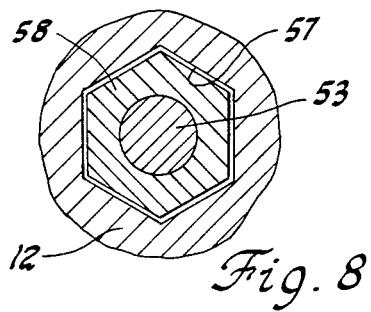
FIG. 8 is a fragmentary, elevation section view of the flow control valve structure illustrated in FIG. 7, taken along the line 8—8 thereof, and looking in the direction of the arrows.

As shown in FIGS. 5 and 7, the outer end of the valve chamber 32 comprises a portion 57 which is hexagonal in cross-section, as shown in FIG. 8. The rear end portion 58 of the valve body 41 is also provided with a circumferential, hexagonal shape so as to be slidably mounted in the hexagonal chamber portion 57. It will be seen that when the flow control adjustment head 43 is rotated in one direction or the other, it will remain in its longitudinal position while turning the threaded shaft 53 inwardly or outwardly of the bore 54 in the valve body 41. The turning of the threaded shaft 53 in the threaded bore 54 causes the valve body 41 to move forwardly or backwardly, in a straight line action, without any rotation, due to the sliding effect of the hexagonal rear end 58 in the hexagonal shaped chamber 57. The positioning of the valve 42 relative to the valve seat 40 is thus controlled by the non-rising type flow control valve 37.

Figure 9:
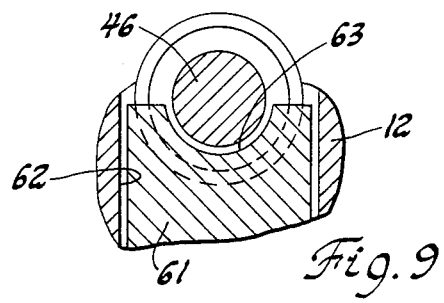
FIG. 9 is a fragmentary, elevation section view of the flow control valve structure illustrated in FIG. 7, taken along the line 9—9 thereof, and looking in the direction of the arrows.
Figure 10:
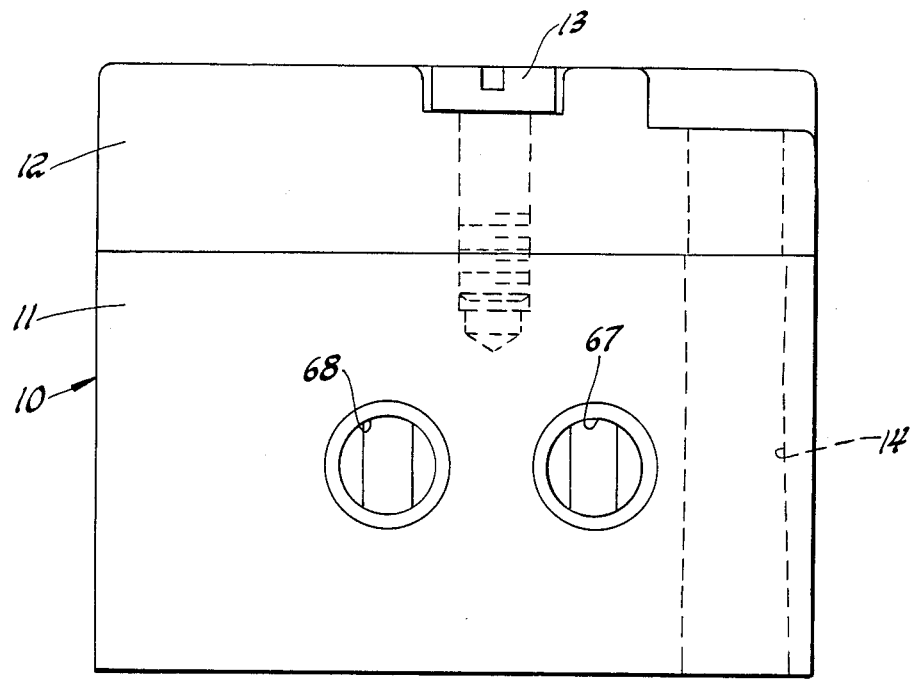
FIG. 10 is a side elevation view of the valve structure illustrated in FIG. 3, taken along the line 10—10 thereof, and looking in the direction of the arrows.

As shown in FIGS. 5, 7 and 9, any longitudinal movement of the flow control adjustment head 43 is prevented by a retention plate 61. As shown in FIGS. 7 and 9, the retention plate 61 is seated in a rectangular slot 62 that extends inwardly from the lower side of the cover plate 12, in a position behind the flow control adjustment head 43. As shown in FIG. 9, the upper end of the retention plate 61 is provided with a U-shaped or semi-circular recess 63 in which is received the screw shaft 46. The retention plate groove 62 is shown in FIG. 4, as extending inwardly from the bottom side of the cover plate 12. It will be seen, that when the adjustment head 43 is turned, that the retention plate 61 slidably engages the rear face of the adjustment head 43 and the outer face of the outer most one of the flanges 47, to prevent longitudinal movement of the adjustment head 43 and the adjusting screw 53. Because the lower end of the retention plate 61 is positioned in the groove 62, in the cover plate 12, the retention plate 61 is held in a stationary position so as to prevent any longitudinal movement of the adjustment head 43 and the adjusting screw 53 when the adjusting screw 53 is turned.

As shown in FIG. 4, the common exhaust passageway 29 in the lower side of the cover plate 12 is also connected through a bore 31a and a downwardly extended passageway 33a, which is connected through passageways the same as passageways 34 and 35 in FIG. 5 to a second annular exhaust chamber 36a, as shown in FIG. 3. The second annular exhaust chamber 36a is also concentric with the valve spool bore 22, and it is formed in a larger diameter bore 64 in a position on the side of the valve spool bore 22 opposite to the first exhaust chamber 36. A second flow control valve 37a, which is identical in structure and function to the prior described flow control valve 37, is positioned in the cover plate 12 to control the flow of fluid through the passageway 34a from the second annular exhaust chamber 36a into the common exhaust passage 29, which is connected to the exhaust port 25 through the passageways 26–28.

In FIG. 1 the second flow control valve is generally indicated by the numeral 37a. The parts of the second flow control valve 37a which are the same as the first described flow control valve 37 have been marked with the same reference numerals followed by the small letter "a".

As shown in FIG. 3, a pair of threaded cylinder or outlet ports 67 and 68 are formed in the valve body 11, in positions longitudinally spaced apart from each other, and on the side which is opposite to the side of the valve body in which the inlet and exhaust ports 16 and 25, respectively, are formed. The cylinder ports 67 and 68 communicate through passageways 69 and 70, respectively, to a pair of annular, cylindrical, cylinder chambers 71 and 72, respectively. The cylinder chambers 71 and 72 are longitudinally spaced apart from the pressurized air inlet chamber 21, and longitudinally spaced inwardly apart from the two exhaust chambers 36 and 36a, respectively.

As shown in FIG. 3, the flow of pressurized air from the inlet chamber 21 and out through the cylinder port 67 and 68, and then back through the valve body 11 and out the exhaust port 25 is controlled by a poppet valve means which includes a longitudinally movable poppet valve spool, generally indicated by the numeral 73. The valve spool 73 is moved to its initial or first operating position shown in FIG. 3 by a return spring 74. The valve spool 73 is moved to the left as viewed in FIG. 3 to a second operating position by a directly connected solenoid, generally indicated by the numeral 75. The solenoid 75 may be of any suitable general purpose, lost motion or floating pole piece type, and either of a low-wattage or high-wattage power consumption, with a controlled stroke. A suitable solenoid, with a floating pole piece which may be used for moving the valve spool 73 to the left, to its second operating position is the solenoid shown in U.S. Pat. No. 4,438,418, or the solenoid with a floating pole piece shown in U.S. Pat. No. 3,538,954.

As shown in FIG. 3, the valve spool 73 comprises an elongated cylindrical body 78, which has a reduced diameter central portion 79, with integral, enlarged diameter, end portions 80 and 81. A poppet valve means is molded around the valve spool body 78 on the reduced diameter portion 79, from any suitable elastomeric material, and it comprises a centrally located poppet valve element 82 and a pair of longitudinally spaced apart, end poppet valve elements 85 and 86. The centrally located poppet valve element 82 extends radially outward from the valve spool surface 79, and it is provided with a pair of converging poppet valve surfaces or faces 83 and 84, which converge towards each other, and are located on the opposite longitudinal ends thereof. The centrally located poppet valve element 82 is integrally connected with the end poppet valve elements 85 and 86 by integral molded elastomeric sleeves 87 and 88, respectively.

As shown in FIG. 3, the end poppet valve elements 85 and 86 each has an inner radial face which terminates at its outer point in a right angle with the outer circumferential periphery of the valve element, to form a valve surface or sharp edged valve face 91 and 92, respectively. The end poppet valve sharp edged valve faces 91 and 92 are adapted to coact with poppet valve seats formed on a pair of bushings, generally indicated by the numerals 93 and 94, respectively.

As shown in FIG. 3, the valve bore 22 communicates with the inlet chamber 21 at a right angle configuration, so as to form a pair of sharp edged, peripheral poppet valve seats 97 and 98, which are adapted to coact with the poppet valve element surfaces 83 and 84, respectively. The valve spool bore 22 has diverging, sloping or chamfered end portions 95 and 96 on each side thereof which communicate with the cylinder chambers 71 and 72, respectively. The outer cylindrical or peripheral surface 90 of the poppet valve element 82 has a larger diameter than the valve spool bore 22. Accordingly, the poppet valve element 82 is non-removable once it is inserted into the position shown in FIG. 3. The sloping or chamfered portions 95 and 96 of the valve spool bore 22 permit the valve spool 73 to be moved longitudinally in the valve body 11 so as to have the valve spool element 82 guided by either the chamfered or sloping face 95 or 96 for compressing the poppet valve element 82 until it is moved into the inlet chamber 21, wherein it will expand and take the position shown in FIG. 3. The design of the end poppet valve elements 85 and 86 is also very critical to the assembly of the valve spool 73 into the valve body 11, as explained hereinafter. Once the valve spool 73 is in the position shown in FIG. 3, with the valve spool element 82 in the inlet chamber 21, the valve spool 73 may not be removed without destroying the poppet valve element 82. The sloping poppet valve element faces 83 and 84 assist the last mentioned forceful insertion of the poppet valve element 82 into the chamber 21, depending from which direction the poppet valve spool 73 is inserted into the poppet valve bore 22.

As shown in FIG. 3, the left end bushing 93 includes a cylindrical valve body, which is threaded on the periphery of the outer end portion 101 thereof, and which outer end portion 101 is threadably mounted in a threaded bore 103 in the valve body 11. The threaded bore 103 in the valve body 11 is coaxial with the valve spool bore 22. The valve body of bushing 93 has an integral cylindrical inner end portion 104 which has a smooth, cylindrical outer peripheral surface of a diameter that is reduced in size from the outer threaded diameter 102 of the outer end portion 101 of the bushing valve body. The cylindrical inner end reduced diameter portion 104 of the bushing 93 is slidably mounted in the bore 38, with its inner end adjacent the cylinder chamber 71. A suitable O-ring seal 105 is mounted in a groove formed in the outer periphery of the bushing body inner end portion 104, and it sealingly engages the surface of the bore 38.

The bushing 93 has an inwardly extended, axial bore 106 formed in the outer end thereof, and it extends inwardly into communication with a transverse, annular exhaust chamber 107 which is aligned with, and communicates with, the transverse annular exhaust chamber 36, through a plurality of peripheral slots 108. The annular exhaust chamber 107 in the bushing body 101 communicates at its inner end, through a chamfered or angled poppet valve seat 113, with a communicating axial bore 109 and an inwardly diverging or chamfered bore 112 that communicates with the cylinder chamber 71. The axial bore 106 is equal in diameter to the valve spool bore 22, and it is coaxial therewith. The valve seat 113 coacts with the sharp edged valve face 91. The axial bore 109 is of a diameter smaller than the diameter of the valve spool bore 22.

As shown in FIG. 3, the left end of the valve spool 73 is provided with an annular groove in the periphery of the enlarged diameter end portion 81 in which is operatively mounted a suitable O-ring seal 114, which sealingly engages the surface of the bore 106. The left end of the poppet valve spool 73 is provided with an inwardly extended axial bore 115 in which is operatively seated the inner end of the return spring 74. The outer end of the return spring 74 seats against the inner surface of a circular retainer plate 116 which is held against the spring 74 by a suitable, releasable retaining ring 117. The retaining ring 117 is operatively seated in an annular groove 118 which is formed in the outer end periphery of the bore 106.

As shown in FIG. 3, the bushing 94 on the right end of the valve spool 73, includes a cylindrical valve body which has an outer end portion 121 that has a threaded outer periphery 122 which is threadably mounted in an axial threaded bore 123 in the valve body 11 that is coaxial with the valve spool bore 22. The inner end portion 124 of the bushing 94 is provided with a smooth, cylindrical outer peripheral surface which is formed to a diameter smaller than the diameter of the valve body outer end portion 121. The cylindrical inner end reduced diameter portion 124 of the bushing 94 is slidably mounted in the bore 64, with its inner end adjacent the cylinder chamber 72, and it has a peripheral groove in which is operatively mounted an O-ring seal 125 for sealing engagement with the surface of the bore 64. A bore 133 is formed inwardly in the bushing body 121, from the outer end thereof and is coaxial with and equal in diameter to valve spool bore 22, and it terminates at its inner end at a transverse annular exhaust chamber 126 that communicates through a plurality of peripheral slots 127 with the second exhaust chamber 36a. The exhaust chamber 126 communicates with the cylinder chamber 72 through a longitudinal axial bore 130 which is of a diameter smaller than the diameter of the valve spool bore 22. The outer end of the bore 130 diverges outwardly to form a sloping poppet valve seat 132 which is coaxial with valve spool bore 22, and which coacts with the sharp edged poppet valve face, indicated by the numeral 92. The bore 130 communicates with the cylinder chamber 72 through a tapered bore 131 which diverges from the bore 130 toward the cylinder chamber 72.

A suitable O-ring seal 134 is mounted in a groove formed in the periphery of the valve spool enlarged right end diameter portion 80, and it sealingly engages the surface of the bore 133.

As shown in FIG. 3, the valve spool 73 is adapted to be directly operated by the operating rod 136 of a solenoid. The enlarged head 137 of the operating rod 136 is seated on the right end of the poppet valve spool 73. The solenoid operating rod is slidably mounted through a bore 138 in the usual pole piece 139 which is biased by a spring 141 into seating engagement against the right end face or seat 140 of the valve body 11. The structure of valve 10 minimizes the tolerance accumulation of the various parts of the valve, to provide for an accurate controlled stroke of the valve spool 73. The tolerances for machining the valve body 11 are determined in a direction to the left of the pole piece seat 140.

Figure 11:
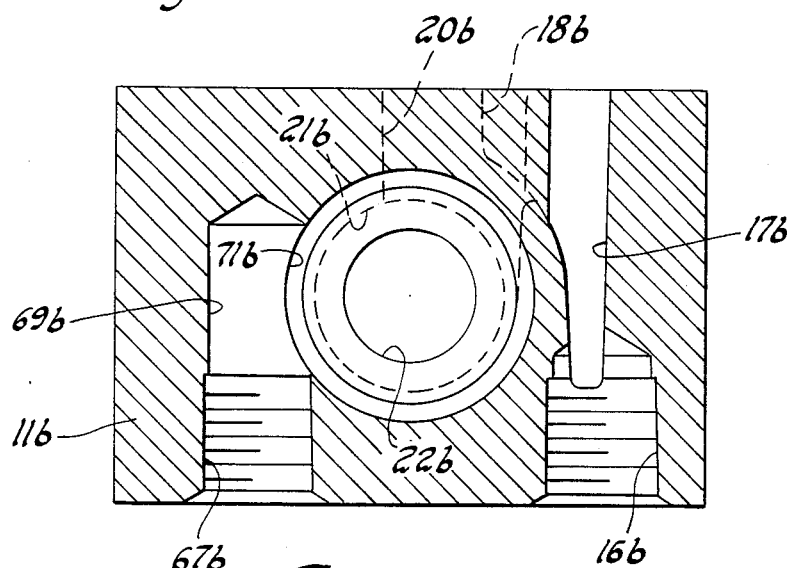
FIG. 11 is a fragmentary, elevation section view of the valve structure illustrated in FIG. 1, and showing a modification wherein the inlet, exhaust and cylinder ports may be positioned in the bottom end of the valve body instead of in the sides thereof.

FIG. 11 is a fragmentary, elevation section view of a modified valve body 11b, and the parts of the modified valve body 11b which are the same as the first described valve body 11 have been marked with the same reference numerals followed by the small letter "b". FIG. 11 illustrates the positioning of the inlet, exhaust and cylinder ports in the bottom side of the valve body instead of an opposite sides of the valve body. The inlet port 16b is shown as being disposed opposite to the one cylinder port 67b. It will be understood that the exhaust port would be aligned on the right side of the valve body 11b in a position behind the inlet port 16b. It will also be understood that the second cylinder port would be aligned with the port 67b in that position behind it. The various chambers formed around the valve spool bore 22b, such as the inlet chamber, the two exhaust chambers, and the two cylinder chambers would all be disposed in identical arrangement as in the first described valve body 11.

In assembly, the poppet valve spool 73 is assembled into the valve body 11 before the bushings 93 and 94, and the solenoid 75, are assembled to the valve body 11. The valve spool 73, with the O-ring seals 114 and 134 mounted thereon, and with lubrication applied thereon, is inserted into the valve spool bore 22, from either end of the valve body 11, until the center poppet valve element 82 stops against one of the conical bores, 95 or 96, leading to the center inlet chamber 21. From this point, the valve spool 73 is formed in a controlled manner into the conical bore 22, compressing the poppet valve element 82 as it passes through the reduced diameter valve spool bore 22 and into the center inlet chamber 21. When the poppet valve element 82 is in the center inlet chamber 21 it expands and returns to its original size and shape. Once the poppet valve element 82 is inside the center inlet chamber 21 the valve spool 73 is captive and cannot be removed from the valve body 11 without destroying the center poppet valve element 82. During the aforegoing insertion of the valve spool 73 into the valve body 11, the end portions of the valve spool 73, including the O-rings 114 and 134 and the end poppet valve elements 85 and 86, must pass relatively, freely through the valve spool bore 22. In order to facilitate the insertion of the valve spool 73 in the last mentioned manner, the O-rings 114 and 134 and the end poppet valve elements 85 and 86 are ground with a diametrical dimension exactly the same as the diameter of the valve spool bore 22. Because the diametrical dimensions of the O-rings 114 and 134 and the poppet end valve elements 85 and 86 are the same as the diameter of the valve spool bore 22, the sharp edged valve seats 97 and 98 will not cut said O-rings and end poppet valve elements when the valve spool 73 is inserted into the valve body 11.

The end bushings 93 and 94 are next installed by aligning the ends of the valve spool 73 with the end bushing bores 109 and 130, respectively, and then threading each of the bushings 93 and 94 into a predetermined initial installed position. The end bushing bores 109 and 130 are smaller than the valve spool bore 22. The valve spool O-ring seals 114 and 134 and the poppet end valve elements 85 and 86 are compressed as they are forced through the conical inner end bores 112 and 131 on the end bushings 93 and 94, respectively, and into their respective initial installed positions after they have moved through the bores 109 and 130 into the annular chambers 107 and 126. The valve spool O-rings 114 and 134 and the poppet end valve elements 85 and 86 expand back to to their normal size after they pass through the reduced diameter bore portions 109 and 130, and into the annular chambers 107 and 126.

To set the final operative positions of the two end bushings 93 and 94, pressurized air is applied to the inlet port 16, and the aforedescribed initial assembled positions of the end bushings 93 and 94 permit a constant flow of the pressurized supply air to flow out the exhaust port 25. A suitable tool is then employed to apply a predetermined load, as for example, a load equal to the return spring 74 to one of the ends of the valve spool 73, as for example, against the left end of valve spool spool 73, as viewed in FIG. 3. The last mentioned load moves the valve spool 73 to a position with the right side sloping face 84, on center poppet valve element 82, seated against the sharp edged poppet valve seat 98. The left end bushing 93 is then adjusted in a counterclockwise direction, or outwardly to the left as viewed in FIG. 3, until the sharp edge 91 on the left end poppet valve sharp edge 91 seats against the conical angled poppet valve seat 113, on the bushing 93, stopping the flow of pressurized air out of the exhaust port 25. A similar load, equal to the return spring load 74, is then applied to the right end of the valve spool 73, so as to move the center poppet valve element 82 and its angled poppet valve face 83 against the sharp edged poppet valve seat 97. The right end bushing 94 is then rotated counterclockwise or to the right, as viewed in FIG. 3, until the sharp edge 92 on the right end poppet valve element 86 seats against the conical valve seat 132, on the bushing 94, stopping the flow of pressurized air out of the exhaust port 25.

The same procedure is carried out in positioning the poppet valve element face 83 against the sharp edge poppet valve seat 97, and the poppet valve element sharp edge 92 on its valve seat 132. When the end bushings 93 and 94 have been adjusted, as described, for seating the poppet end valve elements sharp edges 91 and 92 on their respective seats 113 and 132, the flow of air past each of the poppet end valve elements 85 and 86 and out the exhaust port 25 would be stopped, to indicate that the end bushings have been properly positioned. It will be seen, that the valve spool 73 is designed to permit the aforementioned assembly of the valve in a simple and efficient manner. It will be seen, that the valve spool 73 is balanced when it is seated in either one of its operating positions, for example, the poppet valve element face 83 seating on the valve seat 97 forms a seat at the same diameter as is formed when the sharp edge 91, on the end valve poppet valve element 85, seats on the valve seat 113. The same balancing effect is present between the poppet valve element 82 and the other end poppet valve element 86.

After the poppet valve spool 73, and the end bushings 93 and 94 have been mounted in the valve body 11, as described hereinbefore, the return spring 74, the spring retainer plate 116, the retaining ring 117, and the solenoid 75 are operatively mounted on the valve body 11, together with the flow control cover plate 12 carrying the two flow control valves 37 and 37a.

In use, with the poppet valve spool 73 in the initial or first position shown in FIG. 3, and with the solenoid 75 de-energized, when pressurized air is admitted into the inlet chamber 21 through the inlet port 16, it will flow past the open valve seat 97 and into the cylinder chamber 71 and out through the cylinder port 67 to the air cylinder or other apparatus being operated by the valve 10. Simultaneously, air from said air cylinder or other apparatus is exhausted into the cylinder port 68 and it flows through the cylinder chamber 72 and past the open valve seat 132 and into the exhaust chamber 36a. The exhausting air then flows upwardly and out through the passageways 33a and 31a, and past the flow control valve 37a into the common exhaust passageway 29 in the cover plate 12, from whence it flows downwardly into the passageways 28, 27 and 26 and out the exhaust port 25. It will be understood that if two exhaust ports are desired, the exhaust passageways 31 and 31a could conduct the exhausting air from the cylinder ports 67 and 68 down through separate passageways 26–29 and out separate exhaust ports 25.

When the solenoid 75 is energized the poppet valve spool 73 is moved to the left, to a second operating position, wherein the poppet valve face 83 on the poppet valve element 82 and the sharp edge 92 on the poppet valve element 86 seat against the poppet valve seats 97 and 132, respectively. Inlet air from the chamber 21 then flows into the cylinder chamber 72 and out through the cylinder port 68 to the air cylinder or other apparatus being controlled. Simultaneously, air from said air cylinder or other apparatus enters the port 67 and passes into the cylinder chamber 71 and past the open valve seat 113 into the exhaust chamber 36 and out past the flow control valve 37 and out the exhaust port 25. When the solenoid 75 is de-energized the return spring 74 moves the poppet valve spool 73 to the right, back to the initial or first operating position shown in FIG. 3, with the poppet valve surface 84 and sharp edge 91 in seating engagement with the valve seats 98 and 113, respectively.

The poppet valve spool 73 is a balanced spool. An advantageous feature of the four-way poppet valve of the present invention is that it incorporates a short operative stroke, between the first and second operative positions, for moving a large flow of pressurized fluid through a compact valve structure.

The flow control valves 37 and 37a provide an additional flow control function, and these flow control valves direct the flow of exhaust fluid entering both of the cylinder ports 67 and 68 into a common exhaust passageway, and thence out a single exhaust port 25. The use of the flow control valves 37 and 37a is optional, and the valve 10 could be used without them by providing an appropriate cover without said control valves, or by removing the valves 37 and 37a and plugging up the holes 45 and 45a in the cover plate 12.

INDUSTRIAL APPLICABILITY

The four-way poppet valve of the present invention is adapted for use in industrial air use applications where a directional control valve function is required, and in situations where both such directional control function is required as well as an optional flow control function. For example only, the valve of the present invention may be used for connection to either end of an air cylinder for controlling the operation of an air cylinder in both directions. The air cylinder would be employed in various types of industrial machines.

What is claimed is:
1. A four-way poppet valve, characterized by:
 (a) a valve body having a valve spool bore of a predetermined diameter formed longitudinally therethrough;
 (b) an annular pressurized air supply chamber formed in said valve body around said valve spool bore, and communicating therewith, and having an annular poppet valve seat formed at each longitudinal side thereof at the point of communication with the valve spool bore;

(c) a poppet valve spool movably mounted in said valve spool bore and provided with a poppet valve element formed around the periphery thereof at a longitudinal central position, and having a diameter larger than the predetermined diameter of the valve spool bore and said poppet valve element having a poppet valve face formed on each of the opposite longitudinal peripheral sides thereof for alternate seating on the annular poppet valve seats formed at each longitudinal side of said pressurized air supply chamber;

(d) a pressurized air inlet port in said body and connected by passageway means to said pressurized air supply chamber;

(e) an annular cylinder chamber formed in said valve body, around said valve spool bore, on each longitudinal outer side of the annular pressurized air supply chamber and spaced longitudinally apart therefrom;

(f) an annular exhaust chamber formed in said valve body, around said valve bore, on the longitudinal outward side of each of said cylinder chambers, and spaced longitudinally apart therefrom;

(g) exhaust port means formed in said body and connected by passageway means to the exhaust chambers;

(h) a pair of cylinder ports formed in said body, and each of said cylinder ports being connected by passageway means to one of the annular cylinder chambers;

(i) a first bushing having an axial bore with a diameter smaller than the predetermined diameter of the valve spool bore and being adjustably mounted in one end of said valve body, and being telescopically mounted over one end of said poppet valve spool, and having a first outer end, annular poppet valve seat formed therein and around said valve spool and facing longitudinally outward;

(j) a second bushing having an axial bore with a diameter smaller than the predetermined diameter of the valve spool bore and being adjustably mounted in the other end of said valve body, and being telescopically mounted over the other end of the poppet valve spool, and having a second outer end, annular poppet valve seat formed therein and around said valve spool and facing longitudinally outward;

(k) a first poppet valve element having a diameter identical to the predetermined diameter of the valve spool bore and being mounted around the periphery of said one end of said poppet valve spool and having a poppet valve face disposed longitudinally inward, and a second poppet valve element having a diameter identical to the predetermined diameter of the valve spool bore and being mounted around the periphery of said other end of the poppet valve spool and having a poppet valve face disposed longitudinally inward, for alternative seating engagement with said first and second outer end poppet valve seats, respectively;

(l) a biasing means operatively mounted with said first bushing and engagable with said one end of the poppet valve spool for normally moving it into, and maintaining it in, a first operative position with the first poppet valve element on the one end of the poppet valve spool in seating engagement on the first outer end poppet valve seat on said first bushing, and with a first one of the poppet valve faces on the central positioned poppet valve element on the valve spool in seating engagement on a first one of the poppet valve seats formed at the longitudinal sides of the annular pressurized air supply chamber, so as to allow pressurized air from the annular pressurized air supply chamber to flow through the valve spool bore and into one of the annular cylinder chambers and out the connected cylinder port, and for simultaneously exhausting air entering into the other cylinder port and through the valve spool bore and into one of the annular exhaust chambers and out the exhaust port means; and, (m) a power means operatively mounted on the valve body and directly engagable with the other end of the poppet valve spool for moving the valve spool from said first operative position longitudinally to a second operative position, against the bias of said biasing means, with the second poppet valve element on the other end of the valve spool in seating engagement on the second outer end poppet valve seat on said second bushing, and with the other one of the poppet valve faces on the central positioned poppet valve element on the valve spool in seating engagement on the other one of the valve seats formed at the longitudinal sides of the annular pressurized air supply chamber, so as to allow pressurized air from the annular pressurized air supply chamber to flow through the valve spool bore into the other annular cylinder chamber, and for simultaneously exhausting air entering into the first cylinder port and through the valve spool bore and into the other annular exhaust chamber and out the exhaust port means.

2. A four-way poppet valve, as defined in claim 1, characterized by:

(a) the central positioned poppet valve element and the first and second poppet valve elements on the poppet valve spool are integrally molded around the periphery of said valve spool.

3. A four-way poppet valve, as defined in claim 1, characterized by:

(a) said valve is provided with a separate flow control valve for each of the annular exhaust chambers for controlling the flow of exhausting air therefrom and through the exhaust passageway means to the exhaust port means.

4. A four-way poppet valve, as defined in claim 3, characterized by:

(a) each of said flow control valves is of a non-rising type.

5. A four-way poppet valve, as defined in claim 3, characterized by:

(a) said exhaust flow control valves are each mounted, in a part of the exhaust passageway means formed in a separate cover plate releasably mounted on the valve body.

6. A four-way poppet valve, as defined in claim 5, characterized by:

(a) a part of the pressurized air inlet passageway means between the pressurized air inlet port and the pressurized air supply chamber is formed in the said cover plate.

7. A four-way poppet valve, as defined in either one of claims 1 or 3, characterized by:

(a) said biasing means comprises a spring return means.

8. A four-way poppet valve, as defined in either one of claims 1 or 3, characterized by:

(a) said power means comprises a solenoid means having a floating pole piece.

* * * * *

UNITED STATES PATENT OFFICE
CERTIFICATE OF CORRECTION

Patent No. 4,574,844            Dated March 11, 1986

Inventor(s) James A. Neff and Richard A. Fagerlie

It is certified that error appears in the above-identified patent and that said Letters Patent are hereby corrected as shown below:

Column 1, line 33, "seals" should be --seats--.

Column 8, line 27, "formed" should be --forced--.

Signed and Sealed this

Tenth Day of June 1986

[SEAL]

Attest:

DONALD J. QUIGG

Attesting Officer    Commissioner of Patents and Trademarks